United States Patent
Wang et al.

(10) Patent No.: US 11,983,885 B2
(45) Date of Patent: May 14, 2024

(54) MULTI-THRESHOLD SEGMENTATION METHOD FOR MEDICAL IMAGES BASED ON IMPROVED SALP SWARM ALGORITHM

(71) Applicant: Wenzhou University, Zhejiang (CN)

(72) Inventors: Pengjun Wang, Zhejiang (CN); Songwei Zhao, Zhejiang (CN); Huiling Chen, Zhejiang (CN); Suling Xu, Zhejiang (CN); Wenming He, Zhejiang (CN); Gang Li, Zhejiang (CN)

(73) Assignee: Wenzhou University, Zhejiang (CN)

( * ) Notice: Subject to any disclaimer, the term of this patent is extended or adjusted under 35 U.S.C. 154(b) by 397 days.

(21) Appl. No.: 17/540,232

(22) Filed: Dec. 2, 2021

(65) Prior Publication Data
US 2023/0023963 A1     Jan. 26, 2023

(30) Foreign Application Priority Data
Jul. 14, 2021   (CN) .......................... 202110794722.9

(51) Int. Cl.
*G06T 7/143*     (2017.01)
*G06T 7/00*      (2017.01)

(52) U.S. Cl.
CPC ............ *G06T 7/143* (2017.01); *G06T 7/0012* (2013.01)

(58) Field of Classification Search
CPC .. G06T 7/10; G06T 7/143; G06T 2207/20112
See application file for complete search history.

(56) References Cited

PUBLICATIONS

Faris, H., et al. Salp Swarm Algorithm: Theory, Literature Review, and Application in Extreme Learning Machines. In: Mirjalili, S. et al. Nature-Inspired Optimizers. Studies in Computational Intelligence, vol. 811. Springer, Cham.https://doi.org/10.1007/978-3-030-12127-3_11 (Year: 2020).*

H. S. N. Alwerfali et al.: Multilevel Image Thresholding Based on Hybrid SSA and Fuzzy Entropy, IEEE, published Dec. 13, 2019, Digital Object Identifier 10.1109/ACCESS.2019.2959325 (Year: 2019).*

* cited by examiner

*Primary Examiner* — Wen W Huang
(74) *Attorney, Agent, or Firm* — JCIP GLOBAL INC.

(57) ABSTRACT

The invention discloses a multi-threshold segmentation method for medical images based on an improved salp swarm algorithm. A two-dimensional histogram is established by means of a grayscale image of a medical image and a non-local mean image, then a salp swarm algorithm is used to determine thresholds selected by a Kapur entropy-based threshold method, and the salp swarm algorithm is improved and mutated by an individual-linked mutation strategy during the threshold selection process to avoid local optimization, so that the segmentation effect on the medical image is optimized; and the method has the advantages of good robustness and high accuracy.

1 Claim, 2 Drawing Sheets

MULTI-THRESHOLD SEGMENTATION METHOD FOR MEDICAL IMAGES BASED ON IMPROVED SALP SWARM ALGORITHM

CROSS-REFERENCE TO RELATED APPLICATION

This application claims the priority benefit of China application serial no. 202110794722.9, filed on Jul. 14, 2021. The entirety of the above-mentioned patent application is hereby incorporated by reference herein and made a part of this specification.

TECHNICAL FIELD

The invention relates to a multi-threshold segmentation method for medical images, in particular to a multi-threshold segmentation method for medical images based on an improved salp swarm algorithm.

DESCRIPTION OF RELATED ART

Image segmentation, as the key technology of image pre-processing, is a critical step from image processing to image analysis and is also a difficulty in computer vision, image analysis, and image understanding. Medical image segmentation, as an important application field of medical image processing, can assist doctors in making therapeutic schemes, locating pathological tissue regions, and studying anatomical tissues. However, with the continuous development of medical imaging equipment and imaging technologies, doctors have to devote a huge amount of time and energy to interpret medical images one by one, and correct diagnosis and treatment of patent's conditions by doctors may be affected by the ambient temperature, signal interference, and the uncertainty and complexity of pathological tissue regions during the image acquisition process.

The threshold-based image segmentation method is easy to implement, small in computation and stable in performance, thus having become the most basic and most widely used image segmentation technique at present. The key to the threshold-based image segmentation method is the determination of thresholds. At present, common methods for selecting thresholds include a peak-valley method based on image grayscale histograms, a minimum error method, a transition region-based method, and a maximum entropy-based threshold method. The peak-valley method based on image grayscale histograms has an obvious effect on a single-target or obviously-distinctive images, but has an unsatisfying effect on multi-target images. The minimum error method is relatively complex and difficult to implement. The OTSU method has the defect that unacceptable large black regions may appear and even information of a whole image may be lost when the grayscale difference between a target and a background is not obvious, and this method is extremely sensitive to noise and the size of the target. The maximum entropy (Kapur entropy)-based threshold method can select features flexibly, so users do not need to spend their energy in considering how to use the features in images. However, traditional Kapur entropy-based threshold methods resolve thresholds by an exhaustion method, which may encounter the problem of "exponential explosion", thus causing an extremely low operating rate when a multi-threshold task is performed, wasting too much time, and failing to meet application requirements. Nowadays, optimization algorithms have been used to search for thresholds together with the Kapur entropy-based threshold methods, but most optimization algorithms have the defect of low convergence rate and local optimization. The salp swarm algorithm (SSA), as a novel metaheuristic optimization algorithm, is enlightened by the salp foraging process, which includes three stages of approaching food, wrapping food, and searching for food, and can continuously explore and develop a whole search space. However, the SSA also has the defects of local optimization and premature convergence in the search process, thus reducing the accuracy of threshold-based image segmentation.

BRIEF SUMMARY OF THE INVENTION

The technical issue to be settled by the invention is to provide a multi-threshold segmentation method for medical images based on an improved salp swarm algorithm, which has good robustness and high accuracy. The multi-threshold segmentation method for medical images uses the salp swarm algorithm to determine thresholds selected by a Kapur entropy-based threshold method, and the salp swarm algorithm is improved and mutated by an individual-linked mutation strategy in the threshold selection process to avoid local optimization to optimize the segmentation effect of medical images.

The technical solution adopted by the invention to settle the aforesaid technical issues is as follows: a multi-threshold segmentation method for medical images based on an improved salp swarm algorithm comprises the following steps:

S1: marking a to-be-segmented medical image as I, marking the size of the to-be-segmented medical image as m×n, marking a pixel in the ith row and jth column of the medical image I as (i,j), marking a grayscale of the pixel (i,j) in the medical image I as $a_{i,j}$, and setting the number of thresholds for segmenting the medical image as L=20, wherein i=1, 2, . . . , m, and j=1, 2, . . . , n.

S2: performing non-local mean filtering on the medical image I to obtain a non-local mean image with the size of m×n, marking a pixel in the $i^{th}$ row and $j^{th}$ column of the non-local mean image as $(i_n, j_n)$, and marking a grayscale of the pixel $(i_n, j_n)$ in the non-local mean image as b wherein $i_n$=1, 2, . . . , m, and $j_n$=1, 2, . . . , n.

The pixel in the $i^{th}$ row and $j^{th}$ column of the medical image I corresponds to the pixel in the $i^{th}$ row and $j^{th}$ column of the non-local mean image, and the two pixels constitute a pixel pair; the medical image I corresponds to the non-local mean image to form m×n pixel pairs; the grayscales of the two pixels of each pixel pair constitute a grayscale pair, so that m×n grayscale pairs are obtained; a two-dimensional histogram is established with the grayscales of the pixels of the medical image I as an x-axis and the grayscales of the pixels of the non-local mean image as a y-axis, wherein coordinates of the (i×j)$^{th}$ grayscale pair is $(a_{i,j}, b_{i_n,j_n})$, that is $x=a_{i,j}$, $y=b_{i_n,j_n}$, and the number of times of appearance of the coordinates $(a_{i,j}, b_{i_n,j_n})$ of the grayscale pair in coordinates of the (i×j) grayscale pairs is marked as $f_{i,j}$, so that the numbers of times of appearance $f_{1,1}$~$f_{m,n}$ of the coordinates $(a_{1,1}, b_{1_n,1_n})$ of the first grayscale pair to the coordinates $(a_{i,j}, b_{i_n,j_n})$ of the (i×j)$^{th}$ grayscale pair in the coordinates of the (i×j) grayscale pairs are obtained; a joint probability density of the grayscale $a_{i,j}$ of the pixel (i,j) in the medical image I and the grayscale $b_{i_n,j_n}$ of the pixel $(i_n, j_n)$ in the non-local mean value image is marked as $p(a_{i,j}, b_{i_n,j_n})$, wherein $p(a_{i,j}, b_{i_n,j_n})$ is calculated according to formula (1):

$$p(a_{i,j}, b_{i_n,j_n}) = \frac{f_{i,j}}{m \times n} \tag{1}$$

S3: segmenting the medical image by an improved salp swarm algorithm, specifically as follows:

S3.1: defining a mother salp population and two filial salp populations $X^1$ and $X^2$, wherein population sizes of the mother salp population and the two filial salp populations $X^1$ and $X^2$ are all M=30, that is, the mother salp population includes M individuals, and each filial salp population includes M individuals; each individual in the two filial salp populations is represented by a data matrix constituted by dim=L dimension values in one row and dim columns, each individual in the mother salp population is represented by a data matrix constituted by 2dim=L dimension values in one row and 2dim columns, and the data matrices are called dimension matrices; a lower boundary matrix of the mother salp population is set as lb, and an upper boundary matrix of the mother salp population is set as ub, wherein, lb is a matrix [0, 0, 0, ..., 0] including one row and 2dim columns, ub is a matrix [254, 254, 254, ..., 254] including one row and 2dim columns, $lb_D$ represents the $D^{th}$ element in the lower boundary matrix lb, $ub_D$ represents the $D^{th}$ element in the upper boundary matrix ub, and D=1, 2, ..., 2dim.

S3.2: initializing the filial salp population $X^1$ and the filial salp population $X^2$ respectively to obtain 0-generation filial salp populations $X^{1,0}$ and $X^{2,0}$ specifically as follows:

S3.2.1: assigning each individual in the filial salp population $X^1$ and each individual in the filial salp population $X^2$ respectively according to formula (2) and formula (3):

$$X_{l,d}^1 = \text{rand} * (ub_d - lb_d) + lb_d \tag{2}$$

$$X_{l,d}^2 = \text{rand} * (ub_d - lb_d) + lb_d \tag{3}$$

Wherein, $lb_d$ represents the $d^{th}$ element in the lower boundary matrix lb, $ub_d$ represents the $d^{th}$ element in the upper boundary matrix ub, and d=1, 2, ..., dim; $X_{l,d}^1$ represents the $d^{th}$ dimension value of the $l^{th}$ individual in the filial salp population $X^1$, $X_{l,d}^2$ represents the $d^{th}$ dimension value of the $l^{th}$ individual in the filial salp population $X^2$, and l=1, 2, ..., 30; rand represents a random number between 0 and 1 generated by a random function, and rand is regenerated by the random function before each calculation performed according to formula (2) and formula (3);

S3.2.2: rearranging the dimensional values of each assigned individual in the filial salp population $X^1$ in an increasing order to obtain a 0-generation salp population $X^{1,0}$, marking the $d^{th}$ dimension value of the $l^{th}$ individual in the 0-generation salp population $X^{1,0}$ as $X_{l,d}^{1,0}$, rearranging the dimensional values of each assigned individual in the filial salp population $X^2$ in an increasing order to obtain a 0-generation salp population $X^{2,0}$, marking the $d^{th}$ dimension value of the $l^{th}$ individual in the 0-generation salp population $X^{2,0}$ as $X_{l,d}^{2,0}$.

S3.3: setting a global optimum fitness value best, initially assigning best with a minus infinity, setting a global optimum individual bestposition, and initially setting bestposition as a matrix [0, 0, 0, ..., 0] including one row and 2dim columns.

S3.4: setting a maximum number of iterations of the mother salp population as T=100, setting an iteration variable t, and initially setting t as 1.

S3.5: performing a $t^{th}$ iteration on the mother salp population, specifically as follows:

S3.5.1: setting two threshold vectors $h^{l,t} \wedge s^{l,t}$ capable of storing one row and (L−1) columns of data, rounding off the first dimension value to the (L−1)$^{th}$ dimension value of the $l^{th}$ individual in the (t−1)$^{th}$-generation filial salp population $X^{1,t-1}$ to obtain integers which are put into $h^{l,t}$, and marking $H^{th}$ data in $h^{l,t}$ as $h_H^{l,t}$, wherein H=1, 2, ..., (L−1); rounding off the first dimension value to the (L−1)$^{th}$ dimension value of the $l^{th}$ individual in the (t−1)$^{th}$-generation filial salp population $X^{2,t-1}$ to obtain integers which are put into $s^{l,t}$, and marking $H^{th}$ data in $s^{l,t}$ as $s_H^{l,t}$ and constituting a threshold vector $(h_H^{l,t}, s_H^{l,t})$ by $h_H^{l,t}$ and $s_H^{l,t}$, so that (L−1) pairs of threshold vectors are obtained; segmenting the medical image I into L regions, which are [0,$h_1^{l,t}$, [$h_1^{l,t}$, $h_2^{l,t}$, ..., [$h_{L-1}^{l,t}$, $h_{L-1}^{l,t}$ and [$h_{L-1}^{l,t}$,255 respectively, according to $h^{l,t}$ pairs of grayscales of the medical image I in the two-dimensional histogram, wherein [represents the inclusion of a lower boundary, and the exclusion of an upper boundary; segmenting the medical image I into L regions, which are [0,$s_1^{l,t}$, $s_1^{l,t}$,$s_2^{l,t}$, ..., [$s_{L-2}^{l,t}$,$s_{L-1}^{l,t}$ and [$s_{L-1}^{l,t}$,255 respectively, according to $s^{l,t}$ pairs of grayscales of the medical image I in the two-dimensional histogram, forming L grayscale pair segmentation regions {$N_1$, $N_2$ ... $N_L$} by the L regions obtained by segmentation according to the grayscales of the medical image I in the two-dimensional histogram and L regions obtained by segmentation according to grayscales of the non-local mean image in the two-dimensional histogram, representing the probability of appearance of the kth grayscale pair segmentation region $N_k$ by $I_{N_k}(h_k^{l,t}, s_k^{l,t})$, and marking a Kapur entropy of the current kth grayscale pair segmentation region $N_k$ as $K_{N_k}^t(h_k^{l,t}, s_k^{l,t})$, wherein k=1, 2, ..., (L−1), and the Kapur entropy $K_{N_k}^t(h_k^{l,t}, s_k^{l,t})$ is expressed by formula (4):

$$\begin{cases} K_{N_k}^t(h_k^{l,t}, s_k^{l,t}) = -\sum_{g=h_{k-1}^{l,t}}^{h_k^{l,t}} \sum_{b=s_{k-1}^{l,t}}^{s_k^{l,t}} \frac{p(g,b)}{w_{L-1}} \ln \frac{p(g,b)}{w_{L-1}} \\ w_{L-1} = \sum_{g=h_{k-1}^{l,t}}^{h_k^{l,t}} \sum_{b=s_{k-1}^{l,t}}^{s_k^{l,t}} p(g,b) \end{cases} \tag{4}$$

Wherein, when k=1, $s_0^{l,t}$=0, $h_0^{l,t}$=0, g is an integer, g=0, 1, ..., $h_k^{l,t}$, b is an integer, and b=0, 1, ..., $s_k^{l,t}$; and when the value of (g,b) is not within the m×n grayscale pairs obtained in S2, p(g,b)=0; In represents a natural logarithm.

S3.5.2: obtaining a (t−1)$^{th}$ mother salp population $Y^{t-1}$ by using the dimension values of one row and dim columns of the $l^{th}$ individual of the (t−1)$^{th}$-generation filial salp population $X^{1,t-1}$ as dimension values from the first column to the dim$^{th}$ column of the first row of the mother salp population and using the dimension values of one row and dim columns of the (t−1)$^{th}$-generation filial salp population $X^{2,t-1}$ as dimension values from the (dim+1)$^{th}$ column to the 2dim$^{th}$ column of the first row of the mother salp population, and marking the $D^{th}$ dimension value of the $l^{th}$ individual in the (t−1)$^{th}$ mother salp population $Y^{t-1}$ as $Y_{l,D}^{t-1}$, wherein D=1, 2, ..., 2dim.

S3.5.3: setting an objective function of the $l^{th}$ individual in the (t−1)$^{th}$ mother salp population $Y^{t-1}$ as $R^{l,t-1}$ {($h_1^{l,t}$,$s_1^{l,t}$),($h_2^{l,t}$,$s_2^{l,t}$), ... ($h_{L-1}^{l,t}$,$s_{L-1}^{l,t}$)}, and expressing the objective function by formula (5):

$$R^{l,t-1}\{(h_1^{l,t}, s_1^{l,t}), (h_2^{l,t}, s_2^{l,t}), ... (h_{L-1}^{l,t}, s_{L-1}^{l,t})\} = \tag{5}$$

$$K_{N_1}^t(h_1^{l,t}, s_1^{l,t}) + K_{N_2}^t(h_2^{l,t}, s_2^{l,t}) + ... + K_{N_{L-1}}^t(h_{L-1}^{l,t}, s_{L-1}^{l,t})$$

S3.5.4: substituting the Kapur entropy $K_{N_k}(h_k^{l,t}, s_k^{l,t})$ of the current kth grayscale pair segmentation region $N_k$ obtained by calculation into the objective function of the $l^{th}$ individual in the (t−1)$^{th}$ mother salp population $Y^{t-1}$ to obtain an objective function value of the $l^{th}$ individual in the $(t-1)^{th}$ mother salp population $Y^{t-1}$ by calculation, and using the objective function value as a fitness value fitness $(l)^{t-1}$ of the $l^{th}$ individual in the $(t-1)^{th}$ mother salp population $Y^{t-1}$, so that the fitness values of M individuals in the $(t-1)^{th}$ mother salp population $Y^{t-1}$ are obtained by calculation.

S3.5.5: rearranging the fitness values of the M individuals in the $(t-1)^{th}$ mother salp population $Y^{t-1}$ in an increasing order, marking a maximum fitness value of the $(t-1)^{th}$ mother salp population $Y^{t-1}$ as $bF^{t-1}$, marking a minimum fitness value of the $(t-1)^{th}$ mother salp population $Y^{t-1}$ as $wF^{t-1}$, marking the individual corresponding to the maximum fitness value as $bP^{t-1}$, and using the individual corresponding to the maximum fitness value as an optimum individual of the $(t-1)^{th}$ mother salp population $Y^{t-1}$.

S3.5.6: updating the first individual to the $(M/2)^{th}$ individual in the $(t-1)^{th}$ mother salp population $Y^{t-1}$ according to formula (6) to obtain a first individual to an $(M/2)^{th}$ individual in a $t^{th}$-generation initial mother salp population $F^t$:

$$F^t_{l,D} = \begin{cases} bP^{t-1}_D + c^t((ub_D - lb_D)r1^t + lb_D)r2^t \geq 0 \\ bP^{t-1}_D - c^t((ub_D - lb_D)r1^t + lb_D)r2^t < 0 \end{cases} \quad (6)$$

$$c^t = 2e^{-\left(\frac{4*t}{T}\right)^2} \quad (7)$$

Wherein, $r1^t$ and $r2^t$ represent random numbers between 0 and 1 generated by a random function, $c^t$ is a control parameter and is expressed by formula (7), $bP^{t-1}_D$ represents the $D^{th}$ dimension value of the optimum individual of the $(t-1)^{th}$ mother salp population $Y^{t-1}$, $F_{l,D}^t$ represents the $D^{th}$ dimension value of the $l^{th}$ individual in the $t^{th}$-generation initial mother salp population $F^t$, $ub_D$ and $lb_D$ represent the $D^{th}$ dimension value of an upper boundary and the $D^{th}$ dimension value of a lower boundary, and e is a natural constant.

S3.5.7: updating the $(M/2)^{th}$ individual to the $M^{th}$ individual in the $(t-1)^{th}$ mother salp population $Y^{t-1}$ according to formula (8) to obtain the $(M/2)^{th}$ individual to the $M^{th}$ individual in the $t^{th}$-generation initial mother salp population $F^t$:

$$F^t_l = \tfrac{1}{2}(Y^{t-1}_l + Y^{t-1}_{l-1}) \quad (8)$$

Wherein, $Y^{t-1}_l$ represents the $l^{th}$ individual in the $(t-1)^{th}$ mother salp population $Y^{t-1}$, $Y^{t-1}_{l-1}$ represents the $(l-1)^{th}$ individual in the $(t-1)^{th}$ mother salp population $Y^{t-1}$, and $F_l$ represents the $l^{th}$ individual in the $t^{th}$-generation initial mother salp population $F^t$.

S3.5.8: developing and exploring the $t^{th}$-generation initial mother salp population $F^t$ according to formulas (9)-(12) to obtain a $t^{th}$-generation intermediate mother salp population $G^t$:

$$\begin{cases} G^t_l = F^t_A - r3^t \times Levy^t \times (F^t_B - F^t_C), \quad \theta < 0 \\ G^t_l = F^t_D - r4^t \times |F^t_D - 2r5^t \times F^t_l|, \quad \theta \geq 0 \cap r7^t < 0.5 \\ G^t_l = (bP^{t-1} - \text{mean}(F^t)) - r4^t \times \\ \quad ((ub - lb) \times r6^t + lb) \end{cases} \theta \geq 0 \cap r7^t \geq 0.5 \quad (9)$$

$$Levy^t \sim \frac{\varphi \times \mu^t}{|v^t|^{1/\delta}} \quad (10)$$

$$\varphi = \left[\frac{\Gamma(1+\delta) \times \sin(\pi \times \delta/2)}{\Gamma\left(\left(\frac{\delta+1}{2}\right) \times \delta \times 2^{(\delta-1)/2}\right)}\right]^{1/\delta} \quad (11)$$

$$\theta = \tan(pi \times (r8^t - 0.5)) - (1 - t/T) \quad (12)$$

Wherein, $G_l^t$ represents the $l^{th}$ individual in the $t^{th}$-generation intermediate mother salp population $G^t$ generated after updating, $Levy^t$ is a step parameter and is expressed by formulas (10)-(11), $F_A^t$, $F_B^t$, $F_C^t$ and $F_D^t$ represent four non-repetitive individuals A, B, C and D randomly selected from in the $t^{th}$-generation initial mother salp population $F^t$, $r3^t$, $r4^t$, $r5^t$, $r6^t$, $r7^t$ and $r8^t$ are random numbers between 0 and 1 generated by a random function, and $\mu^t$ is a random number between 0 and 1 generated by a random function, $v^t$ is a random number following normal distribution and is between 0 and 1, $\delta$ is a constant and is set as 1.5, $\Gamma$ is a standard gamma function, $\theta$ is a probability selection coefficient and is expressed by formula (12), pi is $\pi$, mean($F^t$) represents a mean value of the dimension values of the M individuals in the $t^{th}$-generation initial mother salp population $F^t$, tan represents a tangent function, and sin represents a sine function.

S3.5.9: obtaining two initial filial salp populations by using a dimension matrix constituted by dimension values of the first column to the $dim^{th}$ column of the first row of the $l^{th}$ individual in the $t^{th}$-generation initial mother salp population $F^t$ as an $l^{th}$ individual of one initial filial salp population and using a dimension matrix constituted by dimension values of the $(dim+1)^{th}$ column to the $2dim^{th}$ column of the first row of the $l^{th}$ individual in the $t^{th}$-generation initial mother salp population $F^t$ as a $l^{th}$ individual of the other initial filial salp population, and obtaining fitness values of the M individuals in the $t^{th}$-generation initial mother salp population $F^t$ by calculation through a method the same as Step 3.5.1-Step 3.5.4.

Obtaining two intermediate filial salp populations by using a dimension matrix constituted by dimension values of the first column to the $dim^{th}$ column of the first row of the $l^{th}$ individual in the $t^{th}$-generation intermediate mother salp population $G^t$ as a $l^{th}$ individual of one intermediate filial salp population and using a dimension matrix constituted by dimension values of the $(dim+1)^{th}$ column to the $2dim^{th}$ column of the first row of the $l^{th}$ individual in the $t^1$th-generation intermediate mother salp population $G^t$ as a $l^{th}$ individual of the other intermediate filial salp population, and obtaining fitness values of the M individuals in the $t^{th}$-generation intermediate mother salp population $G^t$ by calculation through a method the same as Step 3.5.1-Step 3.5.4.

Rearranging the 2 M individuals, including the M individuals in the $t^{th}$-generation initial mother salp population $F^t$ and the M individuals in the $t^{th}$-generation intermediate mother salp population $G^t$, in an increasing order according to the fitness values of the 2 M individuals, selecting M individuals with larger fitness values, and randomly arranging the M selected individuals to form a new population.

Comparing a maximum fitness value of the new population with the global optimum fitness value best; if the maximum fitness value of the new population is greater than the global optimum fitness value best, updating the global optimum fitness value best with the maximum fitness value, and using the individual corresponding to the maximum fitness value as the global optimum individual bestposition; or, if the maximum fitness value of the new population is not greater than the global optimum fitness value best, keeping the global optimum fitness value best and the global optimum individual bestposition unchanged.

Obtaining two $t^{th}$-generation filial salp populations $X^{1,t}$ and $X^{2,t}$ by using a dimension matrix constituted by dimension values of the first column to the $dim^{th}$ column of the first row of the $l^{th}$ individual in the new population as a $l^{th}$ individual of the $t^{th}$-generation filial salp population $X^{1,t}$ and using a dimension matrix constituted by dimension values of the $(dim+1)^{th}$ column to the $2dim^{th}$ column of the first row of the $l^{th}$ individual in the new populations a $l^{th}$ individual of the $t^{th}$-generation filial salp population $X^{2,t}$, and ending the $t^{th}$ iteration.

S6: determining whether a current value of t is equal to T; if not, updating the value of t with the sum of the current value of t and 1, and then returning to S3.5.1 to perform a next iteration; if so, ending the iteration process, using the first dimension value to the $dim^{th}$ dimension value of the current global optimum individual bestposition as L thresholds for Renyi entropy-based multi-threshold segmentation of the medical image; arranging the L thresholds in an increasing order, and then marking the L thresholds as $Th_1$, $Th_2$, $Th_3$, ..., $Th_{dim}$; setting (L+1) segmentation intervals [0, $Th_1$), [$Th_1$, $Th_2$), [$Th_2$, $Th_3$), ..., [$Th_{dim}$, 255], determining the segmentation interval into which the grayscale of each pixel of the medical image I falls, amending the grayscale of the pixel to a lower boundary of the corresponding segmentation interval into which the pixels falls, obtaining a segmentation grayscale map based on the amended grayscales of the pixels of the medical image I after all grayscales of all the pixels of the medical image I are amended, and obtaining a finally segmented medical image according to the segmentation grayscale map.

Compared with the prior art, the invention has the following advantages: a two-dimensional histogram is established by means of a grayscale image of a medical image and a non-local mean image, then an optimum segmentation threshold is selected by an improved salp swarm algorithm with the Renyi entropy as the fitness, and the salp swarm algorithm is improved and mutated by an individual-linked mutation strategy during the threshold selection process to obtain different populations to avoid local optimization, so that the segmentation effect on the medical image is optimized, local optimization is avoided, and the method has good robustness and high accuracy.

DETAILED DESCRIPTION OF THE INVENTION

The invention will be described in further detail below in conjunction with the accompanying drawings and embodiments.

Figure 1:
FIG. 1 is a grayscale image of a medical image I in Step S1 of a multi-threshold segmentation method for medical images based on an improved salp swarm algorithm according to the invention.

Embodiment 1: a multi-threshold segmentation method for medical images based on an improved salp swarm algorithm comprises the following steps:

S1: a to-be-segmented medical image is marked as I, the size of the to-be-segmented medical image is marked as m×n, a pixel in the $i^{th}$ row and $j^{th}$ column of the medical image I is marked as (i,j), a grayscale of the pixel (i,j) in the medical image I is marked as $a_{i,j}$, and the number of thresholds for segmenting the medical image is set as L=20, wherein i=1, 2, ..., m, and j=1, 2, ..., n; a grayscale image of the medical image I is shown in FIG. 1.

S2: non-local mean filtering is performed on the medical image I to obtain a non-local mean image with the size of m×n, a pixel in the $i^{th}$ row and $j^{th}$ column of the non-local mean image is marked as $(i_n,j_n)$, and a grayscale of the pixel $(i_n,j_n)$ in the non-local mean image is marked as $b_{i_n,j_n}$, wherein $i_n$=1, 2, ..., m, and $j_n$=1, 2, ..., n.

Figure 2:
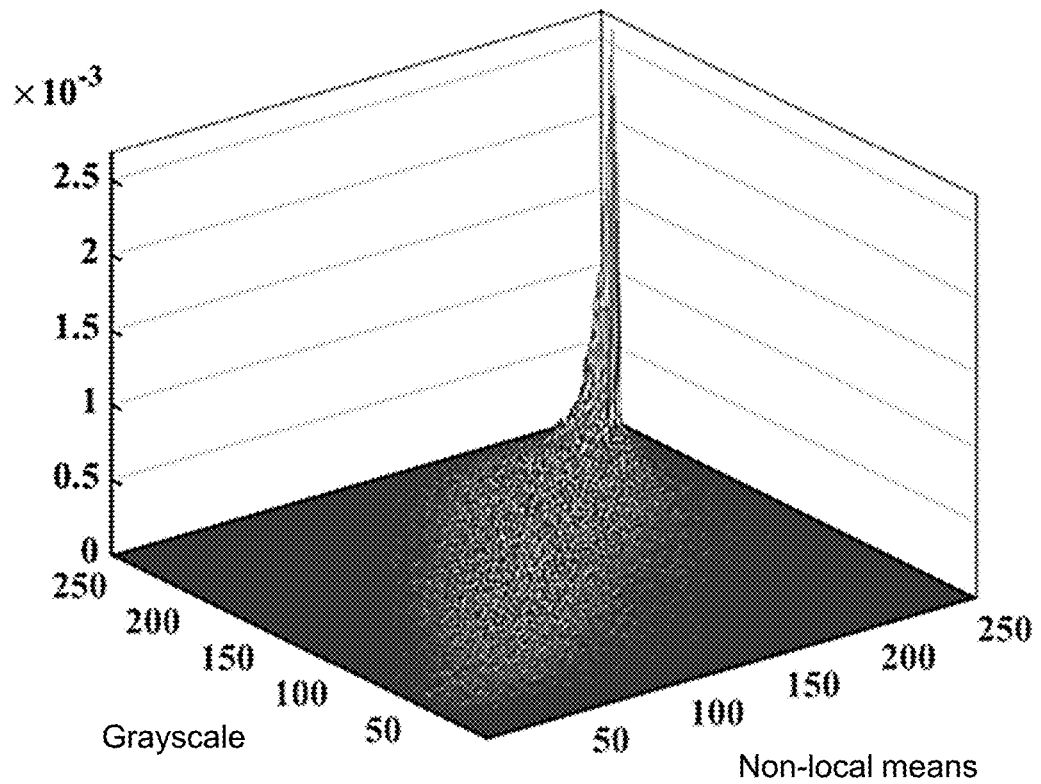
FIG. 2 is a two-dimensional histogram generated by a non-local mean image and a grayscale image of the medical image I in Step 2 of the multi-threshold segmentation method for medical images based on an improved salp swarm algorithm according to the invention.

The pixel in the $i^{th}$ row and $j^{th}$ column of the medical image I corresponds to the pixel in the $i^{th}$ row and $j^{th}$ column of the non-local mean image, and the two pixels constitute a pixel pair; the medical image I corresponds to the non-local mean image to form m×n pixel pairs; the grayscales of the two pixels of each pixel pair constitute a grayscale pair, so that m×n grayscale pairs are obtained; a two-dimensional histogram is established with the grayscales of the pixels of the medical image I as an x-axis and the grayscales of the pixels of the non-local mean image as a y-axis, and the two-dimensional histogram is shown in FIG. 2, wherein coordinates of the $(i×j)^{th}$ grayscale pair are $(a_{i,j}, b_{i_n,j_n})$, that is $x=a_{i,j}$, $y=b_{i_n,j_n}$, and the number of times of appearance of the coordinates $(a_{i,j}, b_{i_n,j_n})$ of the grayscale pair in coordinates of the (i×j) grayscale pairs is marked as $f_{i,j}$, so that the numbers of times of appearance $f_{1,1} \sim f_{m,n}$ of the coordinates $(a_{1,1}, b_{1_n,1_n})$ of the first grayscale pair to the coordinates $(a_{i,j}, b_{i_n,j_n})$ of the $(i×j)^{th}$ grayscale pair in the coordinates of the (i×j) grayscale pairs are obtained; a joint probability density of the grayscale $a_{i,j}$ of the pixel (i,j) in the medical image I and the grayscale $b_{i_n,j_n}$ of the pixel $(i_n,j_n)$ in the non-local mean value image is marked as $p(a_{i,j}, b_{i_n,j_n})$, wherein $p(a_{i,j}, b_{i_n,j_n})$ is calculated according to formula (1):

$$p(a_{i,j}, b_{i_n,j_n}) = \frac{f_{i,j}}{m \times n} \quad (1)$$

S3: the medical image is segmented by an improved salp swarm algorithm, specifically as follows:

S3.1: a mother salp population and two filial salp populations $X^1$ and $X^2$ are defined, wherein population sizes of the mother salp population and the two filial salp populations $X^1$ and $X^2$ are all M=30, that is, the mother salp population includes M individuals, and each filial salp population includes M individuals; each individual in the two filial salp populations is represented by a data matrix constituted by dim=L dimension values in one row and dim columns, each individual in the mother salp population is represented by a data matrix constituted by 2dim=L dimension values in one row and 2dim columns, and the data matrices are called dimension matrices; a lower boundary matrix of the mother salp population is set as lb, and an upper boundary matrix of the mother salp population is set as ub, wherein, lb is a matrix [0, 0, 0, ..., 0] including one row and 2dim columns, ub is a matrix [254, 254, 254, ..., 254] including one row and 2dim columns, $lb_D$ represents the $D^{th}$ element in the lower boundary matrix lb, $ub_D$ represents the $D^{th}$ element in the upper boundary matrix ub, and D=1, 2, . . . , 2dim.

S3.2: the filial salp population $X^1$ and the filial salp population $X^2$ are initialized respectively to obtain 0-generation filial salp populations $X^{1,0}$ and $X^{2,0}$, specifically as follows:

S3.2.1: each individual in the filial salp population $X^1$ and each individual in the filial salp population $X^2$ are assigned respectively according to formula (2) and formula (3):

$$X_{l,d}^1 = \text{rand} *(ub_d - lb_d) + lb_d \quad (2)$$

$$X_{l,d}^2 = \text{rand} *(ub_d - lb_d) + lb_d \quad (3)$$

Wherein, $lb_d$ represents the $d^{th}$ element in the lower boundary matrix lb, $ub_d$ represents the $d^{th}$ element in the upper boundary matrix ub, and d=1, 2, . . . , dim; $X_{l,d}^1$ represents the $d^{th}$ dimension value of the $l^{th}$ individual in the filial salp population $X^1$, $X_{l,d}^2$ represents the $d^{th}$ dimension value of the $l^{th}$ individual in the filial salp population $X^2$, and l=1, 2, . . . , 30; rand represents a random number between 0 and 1 generated by a random function, and rand is regenerated by the random function before each calculation performed according to formula (2) and formula (3).

S3.2.2: the dimensional values of each assigned individual in the filial salp population $X^1$ are rearranged in an increasing order to obtain a 0-generation salp population $X^{1,0}$, the $d^{th}$ dimension value of the $l^{th}$ individual in the 0-generation salp population $X^{1,0}$ is marked as $X_{l,d}^{1,0}$, the dimensional values of each assigned individual in the filial salp population $X^2$ are rearranged in an increasing order to obtain a 0-generation salp population $X^{2,0}$, the $d^{th}$ dimension value of the $l^{th}$ individual in the 0-generation salp population $X^{2,0}$ is marked as $X_{l,d}^{2,0}$.

S3.3: a global optimum fitness value best is set, best is initially assigned with a minus infinity, a global optimum individual bestposition is set, and bestposition is initially set as a matrix [0, 0, 0, . . . , 0] including one row and 2dim columns.

S3.4: a maximum number of iterations of the mother salp population is set as T=100, an iteration variable t is set, and t is initially set as 1.

Figure 3:
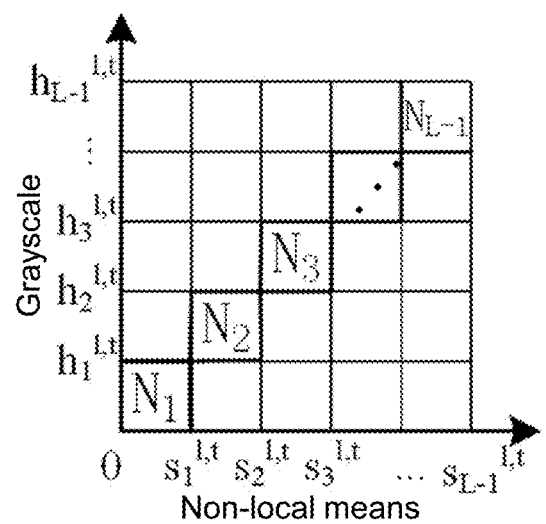
FIG. 3 is a threshold segmentation region chart generated by the non-local mean image and the grayscale image in Step S3.5.1 of the multi-threshold segmentation method for medical images based on an improved salp swarm algorithm according to the invention.
Figure 4:
FIG. 4 is a grayscale map of medical image segmentation in Step S6 of multi-threshold segmentation method for medical images based on an improved salp swarm algorithm according to the invention.

S3.5: a $t^{th}$ iteration is performed on the mother salp population, specifically as follows:

S3.5.1: two threshold vectors $h^{l,t} \wedge s^{l,t}$ capable of storing one row and (L−1) columns of data are set, the first dimension value to the $(L−1)^{th}$ dimension value of the $l^{th}$ individual in the $(t−1)^{th}$-generation filial salp population $X^{1,t−1}$ are rounded off to obtain integers which are put into $h^{l,t}$, and $H^{th}$ data in $h^{l,t}$ is marked as $h_H^{l,t}$, wherein H=1, 2, . . . , (L−1); the first dimension value to the $(L−1)^{th}$ dimension value of the $l^{th}$ individual in the $(t−1)^{th}$-generation filial salp population $X^{2,t−1}$ are rounded off to obtain integers which are put into $s^{l,t}$, and $H^{th}$ data in $s^{l,t}$ is marked as $s_H^{l,t}$, and a threshold vector $(h_H^{l,t}, s_H^{l,t})$ is constituted by $h_H^{l,t}$ and $s_H^{l,t}$, so that (L−1) pairs of threshold vectors are obtained; the medical image I is segmented into L regions, which are $[0, h_1^{l,t}, [h_1^{l,t}, h_2^{l,t}, \ldots, [h_{L-1}^{l,t}, h_{L-1}^{l,t}$ and $[h_{L-1}^{l,t}, 255$ respectively, according to $h^{l,t}$ pairs of grayscales of the medical image I in the two-dimensional histogram, wherein [represents the inclusion of a lower boundary, and the exclusion of an upper boundary; segmenting the medical image I into L regions, which are $[0, s_1^{l,t}, [s_1^{l,t}, s_2^{l,t}, \ldots, [s_{L-2}^{l,t}, s_{L-1}^{l,t}$ and $[s_{L-1}^{l,t}, 255$ respectively, according to $s^{l,t}$ pairs of grayscales of the medical image I in the two-dimensional histogram, forming L grayscale pair segmentation regions $\{N_1, N_2 \ldots N_L\}$ by the L regions obtained by segmentation according to the grayscales of the medical image I in the two-dimensional histogram and L regions obtained by segmentation according to grayscales of the non-local mean image in the two-dimensional histogram, as shown in FIG. 3, the probability of appearance of the kth grayscale pair segmentation region $N_k$ is represented by $I_{N_k}(h_k^{l,t}, s_k^{l,t})$, and a Kapur entropy of the current kth grayscale pair segmentation region $N_k$ is marked as $K_{N_k}^t(h_k^{l,t}, s_k^{l,t})$, wherein k=1, 2, . . . , (L−1), and the Kapur entropy $K_{N_k}^t(h_k^{l,t}, s_k^{l,t})$ is expressed by formula (4):

$$\begin{cases} K_{N_k}^t(h_k^{l,t}, s_k^{l,t}) = -\sum_{g=h_{k-1}^{l,t}}^{h_k^{l,t}} \sum_{b=s_{k-1}^{l,t}}^{s_k^{l,t}} \frac{p(g,b)}{w_{L-1}} \ln \frac{p(g,b)}{w_{L-1}} \\ w_{L-1} = \sum_{g=h_{k-1}^{l,t}}^{h_k^{l,t}} \sum_{b=s_{k-1}^{l,t}}^{s_k^{l,t}} p(g,b) \end{cases} \quad (4)$$

Wherein, when k=1, $s_0^{l,t}=0$, $h_0^{l,t}=0$, g is an integer, g=0, 1, . . . , $h_k^{l,t}$, b is an integer, and b=0, 1, . . . , $s_k^{l,t}$; and when the value of (g,b) is not within the m×n grayscale pairs obtained in S2, p(g,b)=0; In represents a natural logarithm.

S3.5.2: a $(t−1)^{th}$ mother salp population $Y^{t−1}$ is obtained by using the dimension values of one row and dim columns of the $l^{th}$ individual of the $(t−1)^{th}$-generation filial salp population $X^1$,t−1 as dimension values from the first column to the $\text{dim}^{th}$ column of the first row of the mother salp population and using the dimension values of one row and dim columns of the $(t−1)^{th}$-generation filial salp population $X^{2,t−1}$ as dimension values from the $(\text{dim}+1)^{th}$ column to the $2\text{dim}^{th}$ column of the first row of the mother salp population, and the $D^{th}$ dimension value of the $l^{th}$ individual in the $(t−1)^{th}$ mother salp population $Y^{t−1}$ is marked as $Y_{l,D}^{t−1}$, wherein D=1, 2, . . . , 2dim.

S3.5.3: an objective function of the $l^{th}$ individual in the $(t−1)^{th}$ mother salp population $Y^{t−1}$ is set as $R^{l,t−1}\{(h_1^{l,t}, s_1^{l,t}), (h_2^{l,t}, s_2^{l,t}), \ldots (h_{L−1}^{l,t}, s_{L−1}^{l,t})\}$, and the objective function is expressed by formula (5):

$$R^{l,t-1}\{(h_1^{l,t}, s_1^{l,t}), (h_2^{l,t}, s_2^{l,t}), \ldots (h_{L-1}^{l,t}, s_{L-1}^{l,t})\} = \quad (5)$$
$$K_{N_1}^t(h_1^{l,t}, s_1^{l,t}) + K_{N_2}^t(h_2^{l,t}, s_2^{l,t}) + \ldots + K_{N_{L-1}}^t(h_{L-1}^{l,t}, s_{L-1}^{l,t})$$

S3.5.4: the Kapur entropy $K_{N_k}(h_k^{l,t}, s_k^{l,t})$ of the current kth grayscale pair segmentation region $N_k$ obtained by calculation is substituted into the objective function of the $l^{th}$ individual in the $(t−1)^{th}$ mother salp population $Y^{t−1}$ to obtain an objective function value of the $l^{th}$ individual in the $(t−1)^{th}$ mother salp population $Y^{t−1}$ by calculation, and the objective function value is used as a fitness value fitness$(l)^{t−1}$ of the $l^{th}$ individual in the $(t−1)^{th}$ mother salp population $Y^{t−1}$, so that the fitness values of M individuals in the $(t−1)^{th}$ mother salp population $Y^{t−1}$ are obtained by calculation.

S3.5.5: the fitness values of the M individuals in the $(t−1)^{th}$ mother salp population $Y^{t−1}$ are rearranged in an increasing order, a maximum fitness value of the $(t−1)^{th}$ mother salp population $Y^{t−1}$ is marked as $bF^{t−1}$, a minimum fitness value of the $(t−1)^{th}$ mother salp population $Y^{t−1}$ is marked as $wF^{t−1}$, the individual corresponding to the maximum fitness value is marked as $bP^{t−1}$, and the individual corresponding to the maximum fitness value is used as an optimum individual of the $(t−1)^{th}$ mother salp population $Y^{t−1}$.

S3.5.6: the first individual to the $(M/2)^{th}$ individual in the $(t-1)^{th}$ mother salp population $Y^{t-1}$ are updated according to formula (6) to obtain a first individual to an $(M/2)^{th}$ individual in a $t^{th}$-generation initial mother salp population $F^t$:

$$F_{l,D}^t = \begin{cases} bP_D^{t-1} + c^t((ub_D - lb_D)r1^t + lb_D)r2^t \geq 0 \\ bP_D^{t-1} - c^t((ub_D - lb_D)r1^t + lb_D)r2^t < 0 \end{cases} \quad (6)$$

$$c^t = 2e^{-\left(\frac{4*t}{T}\right)^2} \quad (7)$$

Wherein, $r1^t$ and $r2^t$ represent random numbers between 0 and 1 generated by a random function, $c^t$ is a control parameter and is expressed by formula (7), $bP_D^{t-1}$ represents the $D^{th}$ dimension value of the optimum individual of the $(t-1)^{th}$ mother salp population $Y^{t-1}$, $F_{l,D}^t$ represents the $D^{th}$ dimension value of the $l^{th}$ individual in the $t^{th}$-generation initial mother salp population $F^t$, $ub_D$ and $lb_D$ represent the $D^{th}$ dimension value of an upper boundary and the $D^{th}$ dimension value of a lower boundary, and e is a natural constant.

S3.5.7: the $(M/2)^{th}$ individual to the $M^{th}$ individual in the $(t-1)^{th}$ mother salp population $Y^{t-1}$ are updated according to formula (8) to obtain the $(M/2)^{th}$ individual to the $M^{th}$ individual in the $t^{th}$-generation initial mother salp population $F^t$:

$$F_l^t = \tfrac{1}{2}(Y_l^{t-1} + Y_{l-1}^{t-1}) \quad (8)$$

Wherein, $Y^{t-1}$ represents the $l^{th}$ individual in the $(t-1)^{th}$ mother salp population $Y^{t-1}$, $Y_{l-1}^{t-1}$ represents the $(l-1)^{th}$ individual in the $(t-1)^{th}$ mother salp population $Y^{t-1}$, and $F_l^t$ represents the $l^{th}$ individual in the $t^{th}$-generation initial mother salp population $F^t$.

S3.5.8: the $t^{th}$-generation initial mother salp population $F^t$ is developed and explored according to formulas (9)-(12) to obtain a $t^{th}$-generation intermediate mother salp population $G^t$:

$$\begin{cases} G_l^t = F_A^t - r3^t \times Levy^t \times (F_B^t - F_C^t), & \theta < 0 \\ G_l^t = F_D^t - r4^t \times |F_D^t - 2r5^t \times F_l^t|, & \theta \geq 0 \cap r7^t < 0.5 \\ G_l^t = (bP^{t-1} - \text{mean}(F^t)) - r4^t \times \\ \quad ((ub-lb) \times r6^t + lb), & \theta \geq 0 \cap r7^t \geq 0.5 \end{cases} \quad (9)$$

$$Levy^t \sim \frac{\varphi \times \mu^t}{|v^t|^{1/\delta}} \quad (10)$$

$$\varphi = \left[\frac{\Gamma(1+\delta) \times \sin(\pi \times \delta/2)}{\Gamma\left(\left(\frac{\delta+1}{2}\right) \times \delta \times 2^{(\delta-1)/2}\right)}\right]^{1/\delta} \quad (11)$$

$$\theta = \tan(pi \times (r8^t - 0.5)) - (1 - t/T) \quad (12)$$

Wherein, $G_l^t$ represents the $l^{th}$ individual in the $t^{th}$-generation intermediate mother salp population $G^t$ generated after updating, $Levy^t$ is a step parameter and is expressed by formulas (10)-(11), $F_A^t$, $F_B^t$, $F_C^t$ and $F_D^t$ represent four non-repetitive individuals A, B, C, and D randomly selected from in the $t^{th}$-generation initial mother salp population $F^t$, $r3^t$, $r4^t$, $r5^t$, $r6^t$, $r7^t$ and $r8^t$ are random numbers between 0 and 1 generated by a random function, and $\mu^t$ is a random number between 0 and 1 generated by a random function, $v^t$ is a random number following normal distribution and is between 0 and 1, $\delta$ is a constant and is set as 1.5, $\Gamma$ is a standard gamma function, $\theta$ is a probability selection coefficient and is expressed by formula (12), pi is $\pi$, mean($F^t$) represents a mean value of the dimension values of the M individuals in the $t^{th}$-generation initial mother salp population $F^t$, tan represents a tangent function, and sin represents a sine function.

S3.5.9: two initial filial salp populations are obtained by using a dimension matrix constituted by dimension values of the first column to the $\text{dim}^{th}$ column of the first row of the $l^{th}$ individual in the $t^{th}$-generation initial mother salp population $F^t$ as an $l^{th}$ individual of one initial filial salp population and using a dimension matrix constituted by dimension values of the $(\text{dim}+1)^{th}$ column to the $2\text{dim}^{th}$ column of the first row of the $l^{th}$ individual in the $t^{th}$-generation initial mother salp population $F^t$ as a $l^{th}$ individual of the other initial filial salp population, and fitness values of the M individuals in the $t^{th}$-generation initial mother salp population $F^t$ are obtained by calculation through a method the same as Step 3.5.1-Step 3.5.4.

Two intermediate filial salp populations are obtained by using a dimension matrix constituted by dimension values of the first column to the $\text{dim}^{th}$ column of the first row of the $l^{th}$ individual in the $t^{th}$-generation intermediate mother salp population $G^t$ as a $l^{th}$ individual of one intermediate filial salp population and using a dimension matrix constituted by dimension values of the $(\text{dim}+1)^{th}$ column to the $2\text{dim}^{th}$ column of the first row of the $l^{th}$ individual in the $t^1$th-generation intermediate mother salp population $G^t$ as a $l^{th}$ individual of the other intermediate filial salp population, and fitness values of the M individuals in the $t^{th}$-generation intermediate mother salp population $G^t$ are obtained by calculation through a method the same as Step 3.5.1-Step 3.5.4.

The 2 M individuals, including the M individuals in the $t^{th}$-generation initial mother salp population $F^t$ and the M individuals in the $t^{th}$-generation intermediate mother salp population $G^t$, are rearranged in an increasing order according to the fitness values of the 2 M individuals, M individuals with larger fitness values are selected, and the M selected individuals are randomly arranged to form a new population.

A maximum fitness value of the new population is compared with the global optimum fitness value best; if the maximum fitness value of the new population is greater than the global optimum fitness value best, the global optimum fitness value best is updated with the maximum fitness value, and the individual corresponding to the maximum fitness value is used as the global optimum individual bestposition; or, if the maximum fitness value of the new population is not greater than the global optimum fitness value best, the global optimum fitness value best and the global optimum individual bestposition are kept unchanged.

Two $t^{th}$-generation filial salp populations $X^{1,t}$ and $X^{2,t}$ are obtained by using a dimension matrix constituted by dimension values of the first column to the $\text{dim}^{th}$ column of the first row of the $l^{th}$ individual in the new population as a $l^{th}$ individual of the $t^{th}$-generation filial salp population $X^{1,t}$ and using a dimension matrix constituted by dimension values of the $(\text{dim}+1)^{th}$ column to the $2\text{dim}^{th}$ column of the first row of the $l^{th}$ individual in the new populations a $l^{th}$ individual of the $t^{th}$-generation filial salp population $X^{2,t}$, and the $t^{th}$ iteration is ended.

S6: whether a current value of t is equal to T is determined; if not, the value of t is updated with the sum of the current value of t and 1, and then S3.5.1 is performed to perform a next iteration; if so, the iteration process is ended, the first dimension value to the $\text{dim}^{th}$ dimension value of the current global optimum individual bestposition are used as L thresholds for Renyi entropy-based multi-threshold segmentation of the medical image; the L thresholds are arranged in an increasing order, and then the L thresholds are marked as $Th_1, Th_2, Th_3, \ldots, Th_{dim}$; (L+1) segmentation intervals $[0, Th_1), [Th_1, Th_2), [Th_2, Th_3), \ldots, [Th_{dim}, 255]$ are set, the segmentation interval into which the grayscale of each pixel of the medical image I falls is determined, the grayscale of the pixel is amended to a lower boundary of the corresponding segmentation interval into which the pixels falls, a segmentation grayscale map is obtained based on the amended grayscales of the pixels of the medical image I after all grayscales of all the pixels of the medical image I are amended, and a finally segmented medical image is obtained according to the segmentation grayscale map.

What is claimed is:

1. A multi-threshold segmentation method for medical images based on an improved salp swarm algorithm, comprises the following steps:

S1: marking a to-be-segmented medical image as I, marking the size of the to-be-segmented medical image as m×n, marking a pixel in the $i^{th}$ row and $j^{th}$ column of the medical image I as (i,j), marking a grayscale of the pixel (i,j) in the medical image I as $a_{i,j}$, and setting the number of thresholds for segmenting the medical image as L=20, wherein i=1, 2, ..., m, and j=1, 2, ..., n;

S2: performing non-local mean filtering on the medical image I to obtain a non-local mean image with the size of m×n, marking a pixel in the $i^{th}$ row and $j^{th}$ column of the non-local mean image as $(i_n, j_n)$, and marking a grayscale of the pixel $(i_n, j_n)$ in the non-local mean image as b wherein $i_n$=1, 2, ..., m, and $j_n$=1, 2, ..., n;

wherein the pixel in the $i^{th}$ row and $j^{th}$ column of the medical image I corresponds to the pixel in the $i^{th}$ row and $j^{th}$ column of the non-local mean image, and the two pixels constitute a pixel pair; the medical image I corresponds to the non-local mean image to form m×n pixel pairs; the grayscales of the two pixels of each pixel pair constitute a grayscale pair, so that m×n grayscale pairs are obtained; a two-dimensional histogram is established with the grayscales of the pixels of the medical image I as an x-axis and the grayscales of the pixels of the non-local mean image as a y-axis, wherein coordinates of the (i×j)$^{th}$ grayscale pair is $(a_{i,j}, b_{i_n,j_n})$, that is $x=a_{i,j}, y=b_{i_n,j_n}$, and the number of times of appearance of the coordinates $(a_{i,j}, b_{i_n,j_n})$ of the grayscale pair in coordinates of the (i×j) grayscale pairs is marked as $f_{i,j}$, so that the numbers of times of appearance $f_{1,1} \sim f_{m,n}$ of the coordinates $(a_{1,1}, b_{1_n,1_n})$ of the first grayscale pair to the coordinates $(a_{i,j}, b_{i_n,j_n})$ of the (i×j)$^{th}$ grayscale pair in the coordinates of the (i×j) grayscale pairs are obtained; a joint probability density of the grayscale $a_{i,j}$ of the pixel (i,j) in the medical image I and the grayscale $b_{i_n,j_n}$ of the pixel $(i_n, j_n)$ in the non-local mean value image is marked as $p(a_{i,j}, b_{i_n,j_n})$, wherein $p(a_{i,j}, b_{i_n,j_n})$ is calculated according to formula (1):

$$p(a_{i,j}, b_{i_n,j_n}) = \frac{f_{i,j}}{m \times n} \quad (1)$$

S3: segmenting the medical image by an improved salp swarm algorithm, specifically as follows:

S3.1: defining a mother salp population and two filial salp populations $X^1$ and $X^2$, wherein population sizes of the mother salp population and the two filial salp populations $X^1$ and $X^2$ are all M=30, that is, the mother salp population includes M individuals, and each filial salp population includes M individuals; each individual in the two filial salp populations is represented by a data matrix constituted by dim=L dimension values in one row and dim columns, each individual in the mother salp population is represented by a data matrix constituted by 2dim=L dimension values in one row and 2dim columns, and the data matrices are called dimension matrices; a lower boundary matrix of the mother salp population is set as lb, and an upper boundary matrix of the mother salp population is set as ub, wherein, lb is a matrix [0, 0, 0, ..., 0] including one row and 2dim columns, ub is a matrix [254, 254, 254, ..., 254] including one row and 2dim columns, $lb_D$ represents the $D^{th}$ element in the lower boundary matrix lb, $ub_D$ represents the $D^{th}$ element in the upper boundary matrix ub, and D=1, 2, ..., 2dim;

S3.2: initializing the filial salp population $X^1$ and the filial salp population $X^2$ respectively to obtain 0-generation filial salp populations $X^{1,0}$ and $X^{2,0}$, specifically as follows:

S3.2.1: assigning each individual in the filial salp population $X^1$ and each individual in the filial salp population $X^2$ respectively according to formula (2) and formula (3):

$$X_{l,d}^1 = \text{rand} * (ub_d - lb_d) + lb_d \quad (2)$$

$$X_{l,d}^2 = \text{rand} * (ub_d - lb_d) + lb_d \quad (3)$$

wherein, $lb_d$ represents the $d^{th}$ element in the lower boundary matrix lb, $ub_d$ represents the $d^{th}$ element in the upper boundary matrix ub, and d=1, 2, ..., dim; $X_{l,d}^1$ represents the $d^{th}$ dimension value of the $l^{th}$ individual in the filial salp population $X^1$, $X_{l,d}^2$ represents the $d^{th}$ dimension value of the $l^{th}$ individual in the filial salp population $X^2$, and l=1, 2, ..., 30; rand represents a random number between 0 and 1 generated by a random function, and rand is regenerated by the random function before each calculation performed according to formula (2) and formula (3);

S3.2.2: rearranging the dimensional values of each assigned individual in the filial salp population $X^1$ in an increasing order to obtain a 0-generation salp population $X^{1,0}$, marking the $d^{th}$ dimension value of the $l^{th}$ individual in the 0-generation salp population $X^{1,0}$, as $X_{l,d}^{1,0}$, rearranging the dimensional values of each assigned individual in the filial salp population $X^2$ in an increasing order to obtain a 0-generation salp population $X^{2,0}$, marking the $d^{th}$ dimension value of the $l^{th}$ individual in the 0-generation salp population $X^{2,0}$, as $X_{l,d}^{2,0}$;

S3.3: setting a global optimum fitness value best, initially assigning best with a minus infinity, setting a global optimum individual bestposition, and initially setting bestposition as a matrix [0, 0, 0, ..., 0] including one row and 2dim columns;

S3.4: setting a maximum number of iterations of the mother salp population as T=100, setting an iteration variable t, and initially setting t as 1;

S3.5: performing a $t^{th}$ iteration on the mother salp population, specifically as follows:

S3.5.1: setting two threshold vectors $h^{l,t} \wedge s^{l,t}$ capable of storing one row and (L−1) columns of data, rounding off the first dimension value to the (L−1)$^{th}$ dimension value of the $l^{th}$ individual in the $(t-1)^{th}$-generation filial salp population $X^1$, t−1 to obtain integers which are put into $h^{l,t}$, and marking $H^{th}$ data in $h^{l,t}$ as $h_H^{l,t}$, wherein H=1, 2, ..., (L−1); rounding off the first dimension value to the $(L-1)^{th}$ dimension value of the $l^{th}$ individual in the $(t-1)^{th}$-generation filial salp population $X^{2,t-1}$ to obtain integers which are put into $s^{l,t}$, and marking $H^{th}$ data in $s^{l,t}$ as s t, and constituting a threshold vector $(h_H^{l,t}, s_H^{l,t})$ by $h_H^{l,t}$ and $s_H^{l,t}$, so that $(L-1)$ pairs of threshold vectors are obtained; segmenting the medical image I into L regions, which are $[0, h_1^{l,t}, [h_1^{l,t}, h_2^{l,t}, \ldots, [h_{L-1}^{l,t}, h_{L-1}^{l,t}$ and $[h_{L-1}^{l,t}, 255$ respectively, according to $h^{l,t}$ pairs of grayscales of the medical image I in the two-dimensional histogram, wherein [represents the inclusion of a lower boundary, and the exclusion of an upper boundary; segmenting the medical image I into L regions, which are $[0, s_1^{l,t}, [s_1^{l,t}, s_2^{l,t}, \ldots, [s_{L-2}^{l,t}, s_{L-1}^{l,t}$ and $[s_{L-1}^{l,t}, 255$ respectively, according to $s^{l,t}$ pairs of grayscales of the medical image I in the two-dimensional histogram, forming L grayscale pair segmentation regions $\{N_1, N_2 \ldots N_L\}$ by the L regions obtained by segmentation according to the grayscales of the medical image I in the two-dimensional histogram and L regions obtained by segmentation according to grayscales of the non-local mean image in the two-dimensional histogram, representing the probability of appearance of the kth grayscale pair segmentation region $N_k$ by $I_{N_k}(h_k^{l,t}, s_k^{l,t})$, and marking a Kapur entropy of the current kth grayscale pair segmentation region $N_k$ as $K_{N_k}^t(h_k^{l,t}, s_k^{l,t})$, wherein $k=1, 2, \ldots, (L-1)$, and the Kapur entropy $K_{N_k}^t(h_k^{l,t}, s_k^{l,t})$ is expressed by formula (4):

$$\begin{cases} K_{N_k}^t(h_k^{l,t}, s_k^{l,t}) = -\sum_{g=h_{k-1}^{l,t}}^{h_k^{l,t}} \sum_{b=s_{k-1}^{l,t}}^{s_k^{l,t}} \frac{p(g,b)}{w_{L-1}} \ln \frac{p(g,b)}{w_{L-1}} \\ w_{L-1} = \sum_{g=h_{k-1}^{l,t}}^{h_k^{l,t}} \sum_{b=s_{k-1}^{l,t}}^{s_k^{l,t}} p(g,b) \end{cases} \quad (4)$$

Wherein, when $k=1$, $s_0^{l,t}=0$, $h_0^{l,t}=0$, g is an integer, $g=0, 1, \ldots, h_k^{l,t}$, b is an integer, and $b=0, 1, \ldots, s_k^{l,t}$; and when the value of $(g,b)$ is not within the m×n grayscale pairs obtained in S2, $p(g,b)=0$; In represents a natural logarithm;

S3.5.2: obtaining a $(t-1)^{th}$ mother salp population $Y^{t-1}$ by using the dimension values of one row and dim columns of the $l^{th}$ individual of the $(t-1)^{th}$-generation filial salp population $X^{1,t-1}$ as dimension values from the first column to the $dim^{th}$ column of the first row of the mother salp population and using the dimension values of one row and dim columns of the $(t-1)^{th}$-generation filial salp population $X^{2,t-1}$ as dimension values from the $(dim+1)^{th}$ column to the $2dim^{th}$ column of the first row of the mother salp population, and marking the $D^{th}$ dimension value of the $l^{th}$ individual in the $(t-1)^{th}$ mother salp population $Y^{t-1}$ as $Y_{l,D}^{t-1}$, wherein $D=1, 2, \ldots, 2dim$;

S3.5.3: setting an objective function of the $l^{th}$ individual in the $(t-1)^{th}$ mother salp population $Y^{t-1}$ as $R^{l,t-1}\{(h_1^{l,t}, s_1^{l,t}), (h_2^{l,t}, s_2^{l,t}), \ldots (h_{L-1}^{l,t}, s_{L-1}^{l,t})\}$, and expressing the objective function by formula (5):

$$R^{l,t-1}\{(h_1^{l,t}, s_1^{l,t}), (h_2^{l,t}, s_2^{l,t}), \ldots (h_{L-1}^{l,t}, s_{L-1}^{l,t})\} = \quad (5)$$
$$K_{N_1}^t(h_1^{l,t}, s_1^{l,t}) + K_{N_2}^t(h_2^{l,t}, s_2^{l,t}) + \ldots + K_{N_{L-1}}^t(h_{L-1}^{l,t}, s_{L-1}^{l,t})$$

S3.5.4: substituting the Kapur entropy $K_{N_k}(h_k^{l,t}, s_k^{l,t})$ of the current kth grayscale pair segmentation region $N_k$ obtained by calculation into the objective function of the $l^{th}$ individual in the $(t-1)^{th}$ mother salp population $Y^{t-1}$ to obtain an objective function value of the $l^{th}$ individual in the $(t-1)^{th}$ mother salp population $Y^{t-1}$ by calculation, and using the objective function value as a fitness value fitness $(l)^{t-1}$ of the $l^{th}$ individual in the $(t-1)^{th}$ mother salp population $Y^{t-1}$, so that the fitness values of M individuals in the $(t-1)^{th}$ mother salp population $Y^{t-1}$ are obtained by calculation;

S3.5.5: rearranging the fitness values of the M individuals in the $(t-1)^{th}$ mother salp population $Y^{t-1}$ in an increasing order, marking a maximum fitness value of the $(t-1)^{th}$ mother salp population $Y^{t-1}$ as $bF^{t-1}$, marking a minimum fitness value of the $(t-1)^{th}$ mother salp population $Y^{t-1}$ as $wF^{t-1}$, marking the individual corresponding to the maximum fitness value as $bP^{t-1}$, and using the individual corresponding to the maximum fitness value as an optimum individual of the $(t-1)^{th}$ mother salp population $Y^{t-1}$;

S3.5.6: updating the first individual to the $(M/2)^{th}$ individual in the $(t-1)^{th}$ mother salp population $Y^{t-1}$ according to formula (6) to obtain a first individual to an $(M/2)^{th}$ individual in a $t^{th}$-generation initial mother salp population $F^t$:

$$F_{l,D}^t = \begin{cases} bP_D^{t-1} + c^t((ub_D - lb_D)r1^t + lb_D)r2^t \geq 0 \\ bP_D^{t-1} - c^t((ub_D - lb_D)r1^t + lb_D)r2^t < 0 \end{cases} \quad (6)$$

$$c^t = 2e^{-\left(\frac{4*t}{T}\right)^2} \quad (7)$$

wherein, $r1^t$ and $r2^t$ represent random numbers between 0 and 1 generated by a random function, $c^t$ is a control parameter and is expressed by formula (7), $bP_D^{t-1}$ represents the $D^{th}$ dimension value of the optimum individual of the $(t-1)^{th}$ mother salp population $Y^{t-1}$, $F_{l,D}^t$ represents the $D^{th}$ dimension value of the $l^{th}$ individual in the $t^{th}$-generation initial mother salp population $F^t$, $ub_D$ and $lb_D$ represent the $D^{th}$ dimension value of an upper boundary and the $D^{th}$ dimension value of a lower boundary, and e is a natural constant;

S3.5.7: updating the $(M/2)^{th}$ individual to the $M^{th}$ individual in the $(t-1)^{th}$ mother salp population $Y^{t-1}$ according to formula (8) to obtain the $(M/2)^{th}$ individual to the $M^{th}$ individual in the $t^{th}$-generation initial mother salp population $F^t$:

$$F_l^t = \frac{1}{2}(Y_l^{t-1} + Y_{l-1}^{t-1}) \quad (8)$$

wherein, $Y_l^{t-1}$ represents the $l^{th}$ individual in the $(t-1)^{th}$ mother salp population $Y^{t-1}$, $Y_{l-1}^{t-1}$ represents the $(l-1)^{th}$ individual in the $(t-1)^{th}$ mother salp population $Y^{t-1}$, and $F_l$ represents the $l^{th}$ individual in the $t^{th}$-generation initial mother salp population $F^t$;

S3.5.8: developing and exploring the $t^{th}$-generation initial mother salp population $F^t$ according to formulas (9)-(12) to obtain a $t^{th}$-generation intermediate mother salp population $G^t$:

$$\begin{cases} G_l^t = F_A^t - r3^t \times Levy^t \times (F_B^t - F_C^t), & \theta < 0 \\ G_l^t = F_D^t - r4^t \times |F_D^t - 2r5^t \times F_A^t|, & \theta \geq 0 \cap r7^t < 0.5 \\ G_l^t = (bP^{t-1} - \text{mean}(F^t)) - r4^t \times, & \theta \geq 0 \cap r7^t \geq 0.5 \\ \quad ((ub - lb) \times r6^t + lb) \end{cases} \quad (9)$$

$$Levy^t \sim \frac{\varphi \times \mu^t}{|v^t|^{1/\delta}} \quad (10)$$

$$\varphi = \left[ \frac{\Gamma(1+\delta) \times \sin(\pi \times \delta/2)}{\Gamma\left(\left(\frac{\delta+1}{2}\right) \times \delta \times 2^{(\delta-1)/2}\right)} \right]^{1/\delta} \quad (11)$$

$$\theta = \tan(pi \times (r8^t - 0.5)) - (1 - t/T) \quad (12)$$

wherein, $G_l^t$ represents the $l^{th}$ individual in the $t^{th}$-generation intermediate mother salp population $G^t$ generated after updating, $Levy^t$ is a step parameter and is expressed by formulas (10)-(11), $F_A^t$, $F_B^t$, $F_C^t$ and $F_D^t$ represent four non-repetitive individuals A, B, C and D randomly selected from in the $t^{th}$-generation initial mother salp population $F^t$, $r3^t$, $r4^t$, $r5^t$, $r6^t$, $r7^t$ and $r8^t$ are random numbers between 0 and 1 generated by a random function, and $\mu^t$ is a random number between 0 and 1 generated by a random function, $v^t$ is a random number following normal distribution and is between 0 and 1, $\delta$ is a constant and is set as 1.5, $\Gamma$ is a standard gamma function, $\theta$ is a probability selection coefficient and is expressed by formula (12), pi is $\pi$, mean($F^t$) represents a mean value of the dimension values of the M individuals in the $t^{th}$-generation initial mother salp population $F^t$, tan represents a tangent function, and sin represents a sine function;

S3.5.9: obtaining two initial filial salp populations by using a dimension matrix constituted by dimension values of the first column to the $\text{dim}^{th}$ column of the first row of the $l^{th}$ individual in the $t^{th}$-generation initial mother salp population $F^t$ as an $l^{th}$ individual of one initial filial salp population and using a dimension matrix constituted by dimension values of the (dim+1)$^{th}$ column to the $2\text{dim}^{th}$ column of the first row of the $l^{th}$ individual in the $t^{th}$-generation initial mother salp population $F^t$ as a $l^{th}$ individual of the other initial filial salp population, and obtaining fitness values of the M individuals in the $t^{th}$-generation initial mother salp population $F^t$ by calculation through a method the same as Step 3.5.1-Step 3.5.4;

obtaining two intermediate filial salp populations by using a dimension matrix constituted by dimension values of the first column to the $\text{dim}^{th}$ column of the first row of the $l^{th}$ individual in the $t^{th}$-generation intermediate mother salp population G t as a $l^{th}$ individual of one intermediate filial salp population and using a dimension matrix constituted by dimension values of the (dim+1)$^{th}$ column to the $2\text{dim}^{th}$ column of the first row of the $l^{th}$ individual in the $t^{th}$-generation intermediate mother salp population $G^t$ as a $l^{th}$ individual of the other intermediate filial salp population, and obtaining fitness values of the M individuals in the $t^{th}$-generation intermediate mother salp population $G^t$ by calculation through a method the same as Step 3.5.1-Step 3.5.4;

rearranging the 2 M individuals, including the M individuals in the $t^{th}$-generation initial mother salp population $F^t$ and the M individuals in the $t^{th}$-generation intermediate mother salp population $G^t$, in an increasing order according to the fitness values of the 2 M individuals, selecting M individuals with larger fitness values, and randomly arranging the M selected individuals to form a new population;

comparing a maximum fitness value of the new population with the global optimum fitness value best; if the maximum fitness value of the new population is greater than the global optimum fitness value best, updating the global optimum fitness value best with the maximum fitness value, and using the individual corresponding to the maximum fitness value as the global optimum individual bestposition; or, if the maximum fitness value of the new population is not greater than the global optimum fitness value best, keeping the global optimum fitness value best and the global optimum individual bestposition unchanged;

obtaining two $t^{th}$-generation filial salp populations $X^{1,t}$ and $X^{2,t}$ by using a dimension matrix constituted by dimension values of the first column to the $\text{dim}^{th}$ column of the first row of the $l^{th}$ individual in the new population as a $l^{th}$ individual of the $t^{th}$-generation filial salp population $X^{1,t}$ and using a dimension matrix constituted by dimension values of the (dim+1)$^{th}$ column to the $2\text{dim}^{th}$ column of the first row of the $l^{th}$ individual in the new population as a $l^{th}$ individual of the $t^{th}$-generation filial salp population $X^{2,t}$, and ending the $t^{th}$ iteration;

S6: determining whether a current value of t is equal to T; if not, updating the value of t with the sum of the current value of t and 1, and then returning to S3.5.1 to perform a next iteration; if so, ending the iteration process, using the first dimension value to the $\text{dim}^{th}$ dimension value of the current global optimum individual bestposition as L thresholds for Renyi entropy-based multi-threshold segmentation of the medical image; arranging the L thresholds in an increasing order, and then marking the L thresholds as $Th_1$, $Th_2$, $Th_3$, . . . , $Th_{dim}$; setting (L+1) segmentation intervals [0, $Th_1$), [$Th_1$, $Th_2$), [$Th_2$, $Th_3$), . . . , [$Th_{dim}$, 255], determining the segmentation interval into which the grayscale of each pixel of the medical image I falls, amending the grayscale of the pixel to a lower boundary of the corresponding segmentation interval into which the pixels falls, obtaining a segmentation grayscale map based on the amended grayscales of the pixels of the medical image I after all grayscales of all the pixels of the medical image I are amended, and obtaining a finally segmented medical image according to the segmentation grayscale map.

\* \* \* \* \*